April 18, 1939.   R. K. BLACK   2,155,114
MEANS FOR USE IN THE DEMONSTRATION OF OPTICAL SYSTEMS AND APPARATUS
Filed June 27, 1938   2 Sheets-Sheet 1
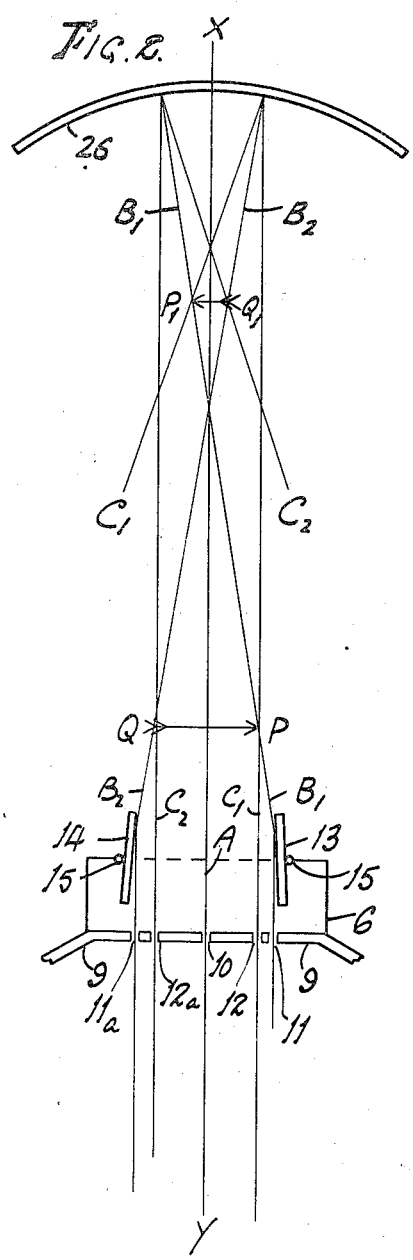
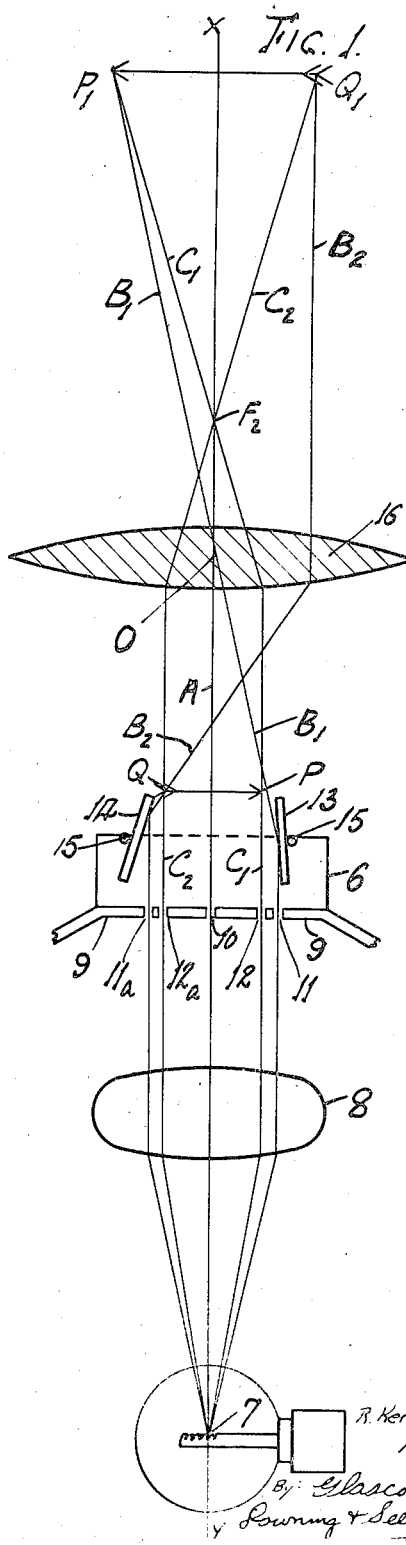

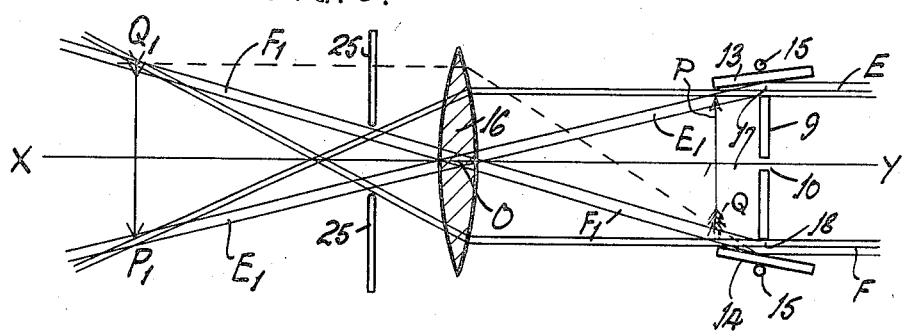
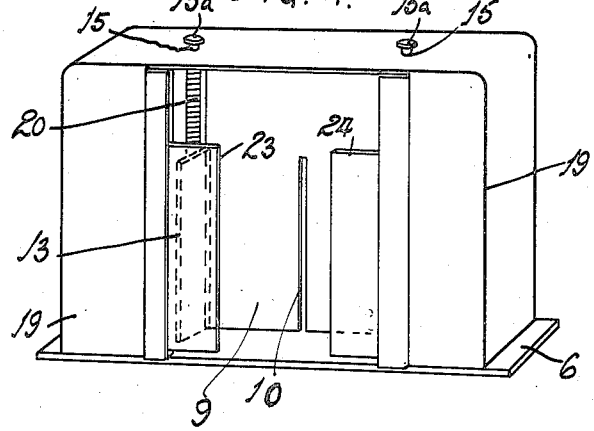
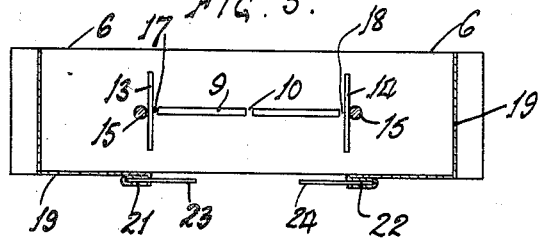

Patented Apr. 18, 1939

2,155,114

UNITED STATES PATENT OFFICE 2,155,114

MEANS FOR USE IN THE DEMONSTRATION OF OPTICAL SYSTEMS AND APPARATUS

Robert Kerr Black, Horwich, England

Application June 27, 1938, Serial No. 216,167
In Great Britain July 3, 1937

3 Claims. (Cl. 35—19)

The invention has reference to the demonstration of optical systems and apparatus, e. g. for the instruction of students in the science of optics, and it has for its object to provide improved means for use in demonstrating the behaviour of light rays or beams passing through or projected upon lenses, mirrors, prisms or the like in whatever arrangement or combination, whereby real images may be displayed upon a screen in their actual dimensions, and the position of virtual images ascertained.

Means in accordance with the invention comprise a pair of pivotally mounted mirrors or reflectors, with which is associated an opaque baffle having parallel slits to enable the passage of a desired number of parallel rays or beams of light from a suitable source, the arrangement being such that certain of the rays or certain portions of the beams passing said baffle are deflected by said mirrors to intersect other undeflected rays or beams in the plane of the object.

The nature of the invention and the manner of its performance are hereinafter more fully described with reference to the accompanying drawings, wherein Fig. 1 and 2 are diagrams respectively illustrating methods whereby one form of apparatus in accordance with the invention may be utilised to demonstrate the characteristics of a convex lens and a concave mirror. Fig. 3 is a similar view to Fig. 1 illustrating the employment of a modified embodiment of the invention in connection with a convex lens, and Figs. 4 and 5 are respectively a front perspective view and a sectional plan of such modified embodiment.

The device employed for the demonstrations illustrated by Figs. 1 and 2 consists essentially of a stand 6 adapted to be erected in the path of parallel rays of light, such as may be emitted by a ray-box of known form incorporating a light source 7 and a cylindrical lens 8. Said stand 6 is provided with a vertical baffle 9 having a single vertical slit 10 located substantially centrally, so as to emit a flat beam A in the normal plane XY of the apparatus, and two further pairs of slits 11, 12 and 11a, 12a are respectively provided at opposite sides of said central slit 10 and spaced equidistantly from the latter. The two outer slits 11, 11a, emit light beams $B_1$, $B_2$, and the two inner slits 12, 12a emit light beams $C_1$, $C_2$, respectively, all said beams being parallel to one another and to the beam A.

Upon said stand 6, at the side of the baffle 9 remote from the light source 7, is also mounted a pair of plane mirrors 13, 14 of any suitable construction, although I prefer to employ speculum mirrors to avoid the formation of multiple images. Each such mirror is mounted with capability of being pivoted about a vertical axis, and they are disposed in the paths of the outermost light beams $B_1$ and $B_2$, respectively. The mirrors 13 and 14 are carried by pivotal spindles 15 and they may be adjusted as to their angular disposition to the normal plane XY by means of knobs or handles attached to said spindles. In a more elaborate form of apparatus (not shown), the mirrors may be provided with a suitable micrometer adjustment having an indicating scale or the like for accurately measuring their angularity to the normal plane. If desired, said mirrors may be inter-connected so as to be adjustable simultaneously and to the same extent.

Fig. 1 illustrates an arrangement of apparatus suitable for demonstrating the behaviour of light rays projected through a simple convex lens from an object located at a point between the source of light and the principal focus of the lens. It will be seen that the mirrors are so adjusted that the outer rays $B_1$, $B_2$ passed by the slits 11, 11a are deflected to intersect the inner rays $C_1$, $C_2$, passed by the slits 12, 12a at the opposite extremities of the object indicated at PQ. The inner rays $C_1$, $C_2$, being parallel to the normal plane XY and equidistant therefrom on opposite sides thereof, are refracted by the convex lens 16 towards the normal at identical angles to intersect at the second focus $F_2$ of the lens, diverging to opposite sides of the normal plane XY. The outer rays $B_1$, $B_2$ converge after intersection with the rays $C_1$, $C_2$ at PQ and are refracted through the lens to intersect the refracted parallel rays $C_1$, $C_2$, at the extremities of the inverted real image $P_1Q_1$ thus projected. By placing a suitable screen at this point, the real image may be viewed and measured.

Differently coloured filters may be interposed in the paths of the several beams, on either side of the baffle 9, to permit the ready identification thereof in their projection on the screen.

Fig. 2 illustrates the method of utilising the device for demonstrating the characteristics of a concave mirror 26. The paths of the rays $B_1$, $B_2$ and $C_1$, $C_2$, after intersection at the extremities of the object PQ, intersect again after reflection to define the image at $P_1Q_1$ in the well-known manner.

Figs. 3, 4 and 5 depict a modified embodiment of the invention, in a form appropriate for manufacture on a commercial scale. In this case, the mirrors 13, 14 are located at the plane of the baffle 9 and the slits 11, 11a, 12, and 12a are dispensed with, the apertures 17, 18 formed between the reflecting surfaces of the mirrors and the outer vertical edges of the baffle 9 being utilised to pass single beams E, F at each side of the normal plane XY. The mirrors 13, 14 are so disposed as to intercept each a portion of one of said beams E, F and to deflect such intercepted portions towards the normal plane through the centre O of the convex lens 16. The said deflected portions $E_1$, $F_1$ thereafter intersect the undeflected portions of the beams after refraction thereof through the lens, thus defining the real inverted image $P_1Q_1$ of the object PQ.

The modified embodiment illustrated in Figs. 4 and 5 is adapted to be attached to one end of a ray-box of known type, and comprising a casing 19 erected upon the stand so as to enclose the baffle 9 and mirrors 13, 14. The pivots 15 of said mirrors project through the upper part of the casing and are fitted with knobs 15a for their manipulation, springs 20 being furnished to hold the mirrors in any angular position to which they may be adjusted.

The front of the casing 19 is apertured to permit the passage of the light beams through the slit 10 and pass the edges of the baffle at 17, 18, the vertical edges of said aperture being provided with slots 21, 22 to retain coloured transparencies or filters 23, 24 for the purpose hereinbefore referred to.

It will be evident that the apparatus is suitable for the demonstration of the optical characteristics of other systems of lenses, mirrors or prisms, or combinations thereof, illustrating the principles of such instruments as telescopes, microscopes, epidiascopes and the like. It is also particularly suited for demonstrating visually the text-book diagrams commonly used in the study of the science of optics, and in any situation where it is required to project two light rays or beams at different angles from a single point.

What I claim as my invention and desire to secure by Letters Patent is:—

1. Apparatus of the type described comprising, an opaque baffle having spaced parallel slits for the passage of light rays from a source therethrough, a pivotally mounted reflector associated with each end of the baffle, some of said slits being arranged to permit light rays to pass through the baffle in an undeflected manner, and said reflectors being movable to deflect light rays passing through slits adjacent the ends of the baffle so that the reflected light rays intersect the undeflected rays in a plane of an object under observation.

2. Apparatus according to claim 1, wherein the reflectors are mounted to pivot about axes in a plane of the baffle, and form apertures between a face of each reflector and the ends of the baffle providing slits for the passage of light rays.

3. Apparatus of the type described comprising, a casing having two open faces, a baffle plate fixed within the casing and having a central slit for the passage of light ray therethrough, two mirrors arranged within the casing, pivoting means supporting each mirror adjacent an edge of the baffle providing an opening substantially parallel to said slit between each mirror and an edge of the baffle, and said pivot means comprising spindles extending through the casing for turning said mirrors.

ROBERT KERR BLACK.